United States Patent
Dake (10) Patent No.: US 10,474,451 B2
(45) Date of Patent: *Nov. 12, 2019

(54) CONTAINERIZED UPGRADE IN OPERATING SYSTEM LEVEL VIRTUALIZATION

(71) Applicant: CISCO TECHNOLOGY, INC., San Jose, CA (US)

(72) Inventor: Steven Charles Dake, Scottsdale, AZ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,738

(22) Filed: Aug. 9, 2018

(65) Prior Publication Data

US 2018/0349128 A1    Dec. 6, 2018

Related U.S. Application Data

(63) Continuation of application No. 15/244,942, filed on Aug. 23, 2016, now Pat. No. 10,073,691.

(51) Int. Cl.
G06F 8/65       (2018.01)
G06F 9/455      (2018.01)
H04L 29/08      (2006.01)

(52) U.S. Cl.
CPC ............ G06F 8/65 (2013.01); G06F 9/45516 (2013.01); H04L 67/34 (2013.01)

(58) Field of Classification Search
CPC ....................................................... G06F 8/65
USPC ....................................................... 717/169
See application file for complete search history.

(56) References Cited

U.S. PATENT DOCUMENTS

| 10,027,658 B1 * | 7/2018 | Schwarz ............... H04L 63/083 |
| 10,191,778 B1 * | 1/2019 | Yang ..................... G06F 9/5055 |
| 2006/0070058 A1 | 3/2006 | Menahemi et al. |
| 2009/0217260 A1 | 8/2009 | Gebhart et al. |
| 2012/0110150 A1 | 5/2012 | Kosuru et al. |
| 2013/0223206 A1 | 8/2013 | Dake et al. |

(Continued)

FOREIGN PATENT DOCUMENTS

| EP | 256463 A2 | 2/1988 |
| EP | 381386 A2 | 8/1990 |

OTHER PUBLICATIONS

"Docker Overview [Parts One and Two]"; Deis.com website (complete URL listed in ref.); Mar. 29, 2016, 19 pages.

(Continued)

*Primary Examiner* — Anna C Deng
*Assistant Examiner* — Clint Thatcher
(74) *Attorney, Agent, or Firm* — Johnson, Marcou & Isaacs, LLC (57) ABSTRACT

Utilizing several passes of a token among the operating system level virtualization applications (OSLVAs) running on each of an ordered list of nodes selectively upgrade user applications in specific containers after determining that each OSVLA hosting a container to be upgraded is live. A failed liveness check can cause a revision to the list of nodes. Post-upgrade health checks of each application, and a list-wide notification of a completed upgrade of the application instances, can follow a successful upgrade. A roll back of the upgrade across all nodes can follow an unsuccessful upgrade.

18 Claims, 7 Drawing Sheets

(56) References Cited

U.S. PATENT DOCUMENTS

| | | |
|---|---|---|
| 2016/0182315 A1 | 6/2016 | Salokanto et al. |
| 2016/0203008 A1 | 7/2016 | Schwenz et al. |
| 2017/0052807 A1 | 2/2017 | Kristiansson et al. |
| 2017/0180249 A1 | 6/2017 | Shen et al. |
| 2017/0180250 A1 | 6/2017 | Jianjun et al. |
| 2017/0235563 A1 | 8/2017 | Bafna et al. |
| 2018/0060057 A1 | 3/2018 | Dake |
| 2019/0102265 A1* | 4/2019 | Ngo .................. H04L 67/1034 |

OTHER PUBLICATIONS

"Docker Service Update"; Docker.com website (complete URL listed in ref.); Jun. 20, 2016, 10 pages.
"Apply_rolling_updates_to_service_July_29_2018", 4 pages.
Amir, et al., "The Totem Single-Ring Ordering", Proceedings of the IEE International Conference on Information Engineering, Singapore (Dec. 1991) and in the Proceedings of the IEE 13th International Conference on Distributed Computing Systems, Pittsburgh, Pa (May 1993)., 29 pages.
Hoisl, "European Search Report for European Patent Application No. 17183723.0;", dated Jan. 4, 2018, 9 pages.
Koch, et al., "The Totem Redundant Ring Protocol", CDCS 2002 Proceedings of the 22nd International Conference on Distributed Computing Systems (ICDCS'02), 10 pages.
Thatcher, "Office Action issued U.S. Appl. No. 15/244,942, filed Aug. 23, 2016,", dated Jan. 8, 2018.
Hoisl, Office Action issued in European Patent Application No. 17183723.0; dated Apr. 8, 2019, 4 pages.

* cited by examiner

Establishing an ordered list of networked nodes executing OS-level virtualization and hosting at least one containerized application to be upgraded
210

↓

First communicating, among the nodes in the listed order and with return to the first node from the last node, a token, and first updating, by the OS-level virtualization application (OSLVA) at each node receiving the token, the first communicated token with an indication of the liveness of the OSLVA
220

↓

In response to receiving, by the first node from the last node, the first updated token, second communicating, among the nodes and with return, the first updated token including upgrade info, and second updating the second communicated token to indicate an upgrade status of applications at that node
230

↓

In response to receiving, by the first node from the last node, the second updated token indicating a successful upgrade of each containerized application to be upgraded, third communicating, among the nodes and with return, the second updated token; and third updating, by the OSLVA, the third communicated token to indicate the health of each upgraded containerized app. at each node receiving the third communicated token.
240

```
┌─────────────────────────────────────────────────────────────────────────┐
│  Establishing an ordered list of networked nodes executing OS-level     │
│  virtualization and hosting at least one containerized application to   │
│  be upgraded                                                            │
│                              210                                        │
└─────────────────────────────────────────────────────────────────────────┘
                                  ▼
┌─────────────────────────────────────────────────────────────────────────┐
│  First communicating, among the nodes in the listed order and with      │
│  return to the first node from the last node, a token, and first        │
│  updating, by the OS-level virtualization application (OSLVA) at each   │
│  node receiving the token, the first communicated token with an         │
│  indication of the liveness of the OSLVA                                │
│                              220                                        │
└─────────────────────────────────────────────────────────────────────────┘
                                  ▼
┌─────────────────────────────────────────────────────────────────────────┐
│  In response to receiving, by the first node from the last node, the    │
│  first updated token, second communicating, among the nodes and with    │
│  return, the first updated token including upgrade info, and second     │
│  updating the second communicated token to indicate an upgrade status   │
│  of applications at that node                                           │
│                              230                                        │
└─────────────────────────────────────────────────────────────────────────┘
                                  ▼
┌─────────────────────────────────────────────────────────────────────────┐
│  In response to receiving, by the first node from the last node, the    │
│  second updated token indicating a successful upgrade of each           │
│  containerized application to be upgraded, third communicating, among   │
│  the nodes and with return, the second updated token; and third         │
│  updating, by the OSLVA, the third communicated token to indicate the   │
│  health of each upgraded containerized app. at each node receiving the  │
│  3rd communicated token.                                                │
│                              240                                        │
└─────────────────────────────────────────────────────────────────────────┘
                                  ▼
┌─────────────────────────────────────────────────────────────────────────┐
│  In response to the first listed node receiving the third updated       │
│  token indicating a favorable health of all upgraded applications,      │
│  fourth communicating, among the nodes in the listed order, the token,  │
│  updated to indicate successful upgrade of all containerized            │
│  applications to be upgraded                                            │
│                              450                                        │
└─────────────────────────────────────────────────────────────────────────┘
```

```
┌─────────────────────────────────────────────────────────────────────┐
│ Establishing an ordered list of networked nodes executing OS-level  │
│   virtualization and hosting at least one containerized             │
│              application to be upgraded                             │
│                           210                                       │
└─────────────────────────────────────────────────────────────────────┘
                                │
                                ▼
┌─────────────────────────────────────────────────────────────────────┐
│ First communicating, among the nodes in the listed order and with   │
│ return to the first node from the last node, a token, and first     │
│ updating, by the OS-level virtualization application (OSLVA) at     │
│ each node receiving the token, the first communicated token with an │
│            indication of the liveness of the OSLVA                  │
│                           220                                       │
└─────────────────────────────────────────────────────────────────────┘
                                │
                                ▼
┌─────────────────────────────────────────────────────────────────────┐
│ In response to receiving, by the first node from the last node, the │
│ first updated token, second communicating, among the nodes and with │
│ return, the first updated token including upgrade info, and second  │
│ updating the second communicated token to indicate an upgrade       │
│              status of applications at that node                    │
│                           230                                       │
└─────────────────────────────────────────────────────────────────────┘
                                │
                                ▼
┌─────────────────────────────────────────────────────────────────────┐
│ In response to either of a) the first listed node receiving the     │
│ second updated token indicating an unsuccessful upgrade of at least │
│ one application to be upgraded, and b) the first listed node not    │
│ receiving the second updated token upon the fulfillment of a set of │
│ predetermined conditions after the first listed node has            │
│ communicated the second communicated token to the next node in the  │
│ list, third communicating, among the nodes in the order and with    │
│ return, the token, wherein the OS-level virtualization application  │
│ at each node receiving the third communicated token rolls back the  │
│ upgrade of each upgraded application at the node receiving the      │
│ third communicated token in accordance with the third communicated  │
│                              token                                  │
│                              540                                    │
└─────────────────────────────────────────────────────────────────────┘
```

Establishing an ordered list of networked nodes executing OS-level virtualization and hosting at least one containerized application to be upgraded
210

First communicating, among the nodes in the listed order and with return to the first node from the last node, a token, and first updating, by the OS-level virtualization application (OSLVA) at each node receiving the token, the first communicated token with an indication of the liveness of the OSLVA
220

In response to one of a) the first listed node receiving the first communicated token indicating not liveness of the list of nodes, and b) the first listed node not receiving the first communicated token upon the fulfillment of a set of predetermined conditions, reestablishing the list of networked nodes with a proper subset of the networked nodes; and first communicating the token in accordance with the reestablished list.
630

CONTAINERIZED UPGRADE IN OPERATING SYSTEM LEVEL VIRTUALIZATION

CROSS-REFERENCE TO RELATED APPLICATIONS

This application is a continuation of and claims priority to U.S. patent application Ser. No. 15/244,942, filed Aug. 23, 2016, and entitled "Containerized Upgrade in Operating System Level Virtualization." The entire contents of the above-identified priority application are hereby fully incorporated herein by reference.

TECHNICAL FIELD

The disclosed technology relates to computing resources virtualization. In particular, example embodiments relate to controlling user application upgrades across multiple nodes in a container-based operating system level virtualization environment.

BACKGROUND

"Operating system level virtualization" ("OS-level virtualization") refers to the use of multiple isolated user-space instances under a common operating system, in which the common operating system is running directly on a physical computer. An OS-level virtualization instance may be referred to as a "container," a "software container," or a "jail." Containers, and the user applications executing therein, across multiple physical computers may be managed by a central program, with an OS-level virtualization "runtime" engine in each operating system. Each user application instance may appear logically as running on a separate machine. Typically, a container holds a version of a user application and all the files needed to support the user application, for example, libraries and system tools. OS-level virtualization differs from hardware virtualization. In hardware virtualization, each virtual instance operates under its own OS, which can be a different OS from the one running in the underlying physical computer.

OS-level virtualization typically employs one runtime engine per OS, similar in role to a hypervisor used in hardware virtualization. Each runtime engine, in cooperation with the central container management program, may create and maintain multiple containers, and manage input/output (I/O) between outside entities and containerized user applications. Each container may be "immutable," meaning that the contents of any specific container are never modified, upgraded, or downgraded. When a user application running in a container environment needs to be modified, another container holding the new version of the user application is created, and the runtime engine and managing application (such as the DOCKER™ OS-level virtualization application) point to the new container for I/O between outside entities and the containerized user application. In one aspect of the immutable container approach, in order to "roll back" a user application (meaning to revert to the most recent version of the user application before the current version), the OS-level virtualization application (OSLVA) need merely point to the container housing the prior version of the user application.

DETAILED DESCRIPTION OF EXAMPLE EMBODIMENTS

"Liveness" refers to an application's ability to make progress in execution in a timely manner, for example, without "deadlock," or "starvation." If an application is free from deadlock, then some process of an application will make progress at some point. If an application is free from starvation, all processes of an application seeking to execute will make progress at some point. As used herein, a negative liveness state is described as "failed liveness." Embodiments of the present technology determine the liveness of the OSVLA.

"Token" passing is, among other things, a channel access method. In token passing, a message called a "token" is passed between nodes in an ordered logical ring. The most well-known examples are token ring computer networks that use token passing for access to the network channel. Embodiments of the present technology use a token passing approach for controlling upgrades to containerized applications.

In an OS-level virtualization environment, knowing the "health" of a user application is beneficial. A user application's health can be described by various metrics, including, but not limited to, central processing unit (CPU) utilization, the amount or percentage of allocated free memory available in the user application's container, the amount or percentage of allocated swap space available in the user application's container, the amount or percentage of allocated file disk space available in the user application's container, and the amount or percentage of network I/O used by the container.

Embodiments of the present technology utilize several passes of a token among the OSVLAs running on each of an ordered list of nodes to selectively upgrade containerized user applications after determining that each OSVLA hosting a container to be upgraded is live. In some embodiments, a failed liveness check causes a revision to the list of nodes. In some embodiments, post-upgrade health checks of each containerized application, and a list-wide notification of a completed upgrade of the application instances, follow a successful upgrade. In some embodiments, a roll back of the upgrade across all nodes follows an unsuccessful upgrade.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
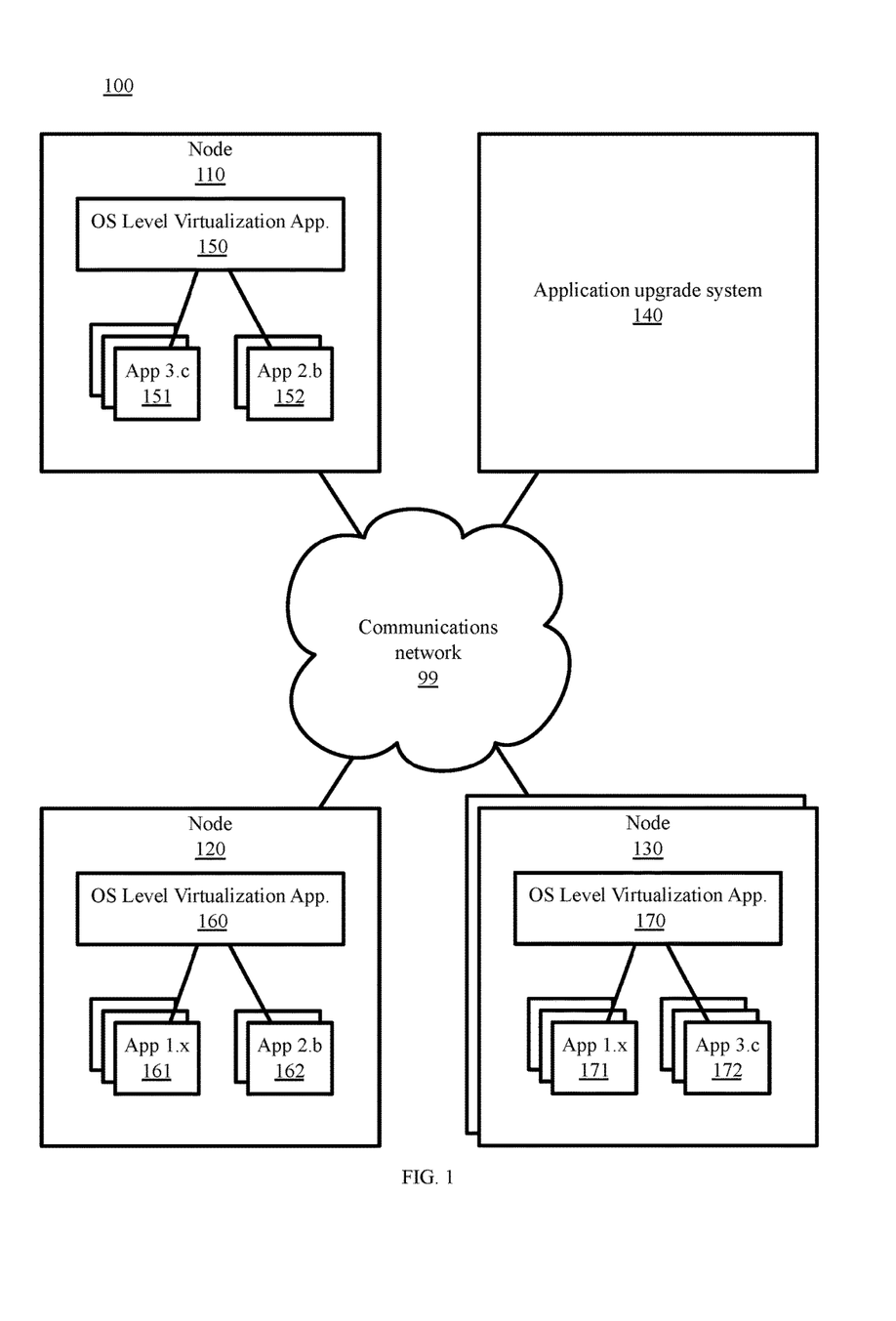
FIG. 1 is a block diagram depicting a communications and processing architecture to update containerized applications, in accordance with certain example embodiments.

As depicted in FIG. 1, the architecture 100 includes network computing devices 110, 120, 130 and 140, each of which may be configured to communicate with one another via communications network 99. Network computing device(s) 110, 120, and 130 can each include an OSLVA 150, 160, and 170, respectively, to manage one or more containers 151, 152, 161, 162, 171, and 172.

Each container corresponds to a version of a user application. For example, user application 1 resides in container 161 under management of OSLVA 160 on node 120, and in container 171 under management of OSLVA 170 on node 130. Any number of versions of user Application 1 may exist under each of OSLVA 160 and OSVLA 170—with version x being the current version. In typical implementations, dozens of versions of each of dozens of applications may exist under an OSLVA across hundred of nodes.

Network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, or a partition of a server, router virtual machine or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, a user associated with a device must install an application and/or make a feature selection to obtain the benefits of the technology described herein.

The network connections illustrated are examples and other approaches for establishing a communications link between the computers and devices can be used. Additionally, those having ordinary skill in the art having the benefit of this disclosure will appreciate that the network devices illustrated in FIG. 1 may have any of several other suitable computer system configurations. For example, one or both of network devices 110, 120, and 130 can be embodied as a mobile phone or handheld computer, and may not include all the components described above.

Figure 7:
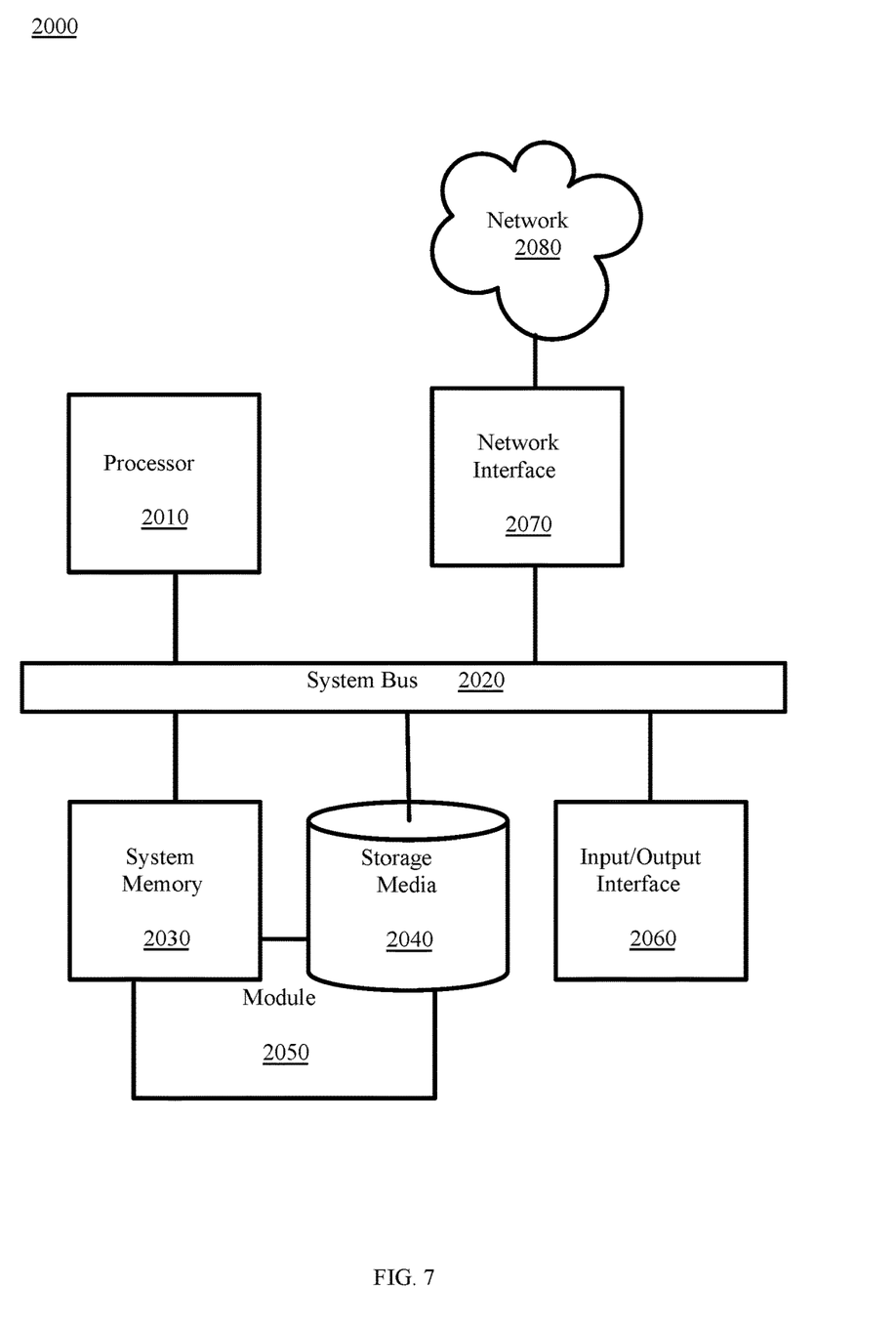
FIG. 7 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein, may by any of the components discussed in more detail with respect to FIG. 7. The computing machines discussed herein may communicate with one another, as well as with other computing machines or communication systems over one or more networks, such as network 99. The network 99 may include any type of data or communications network, including any of the network technology discussed with respect to FIG. 7.

EXAMPLE EMBODIMENTS

The example embodiments illustrated in the following figures are described hereinafter with respect to the components of the example operating environment and example architecture described elsewhere herein. The example embodiments may also be practiced with other systems and in other environments.

Figure 2:
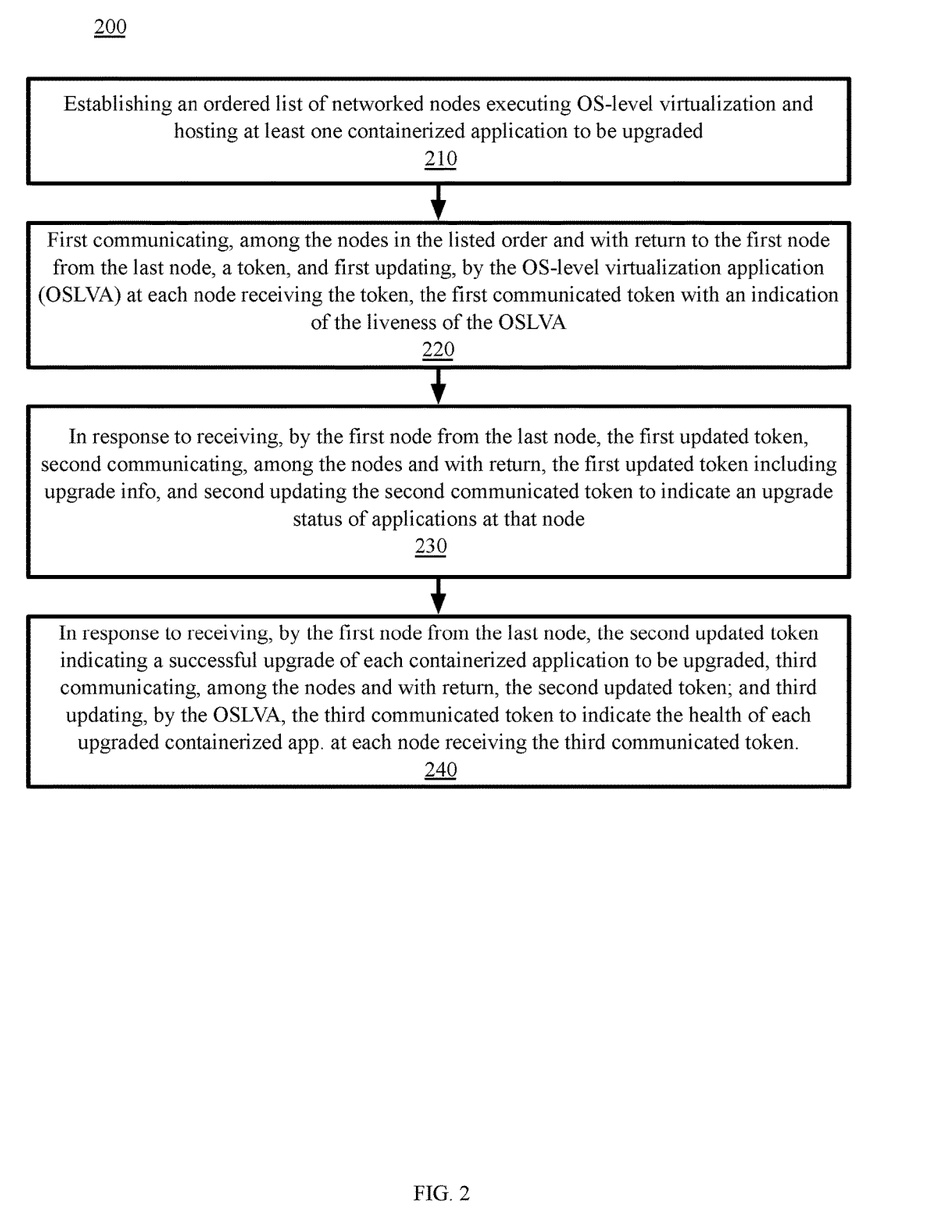
FIG. 2 is a block flow diagram depicting a method to update containerized applications, in accordance with certain example embodiments.

Referring to FIG. 2, and continuing to refer to FIG. 1 for context, a block flow diagram depicting a method 200 to update containerized applications is illustrated, in accordance with certain example embodiments. In such a method 200, the application upgrade system 140 establishes an ordered list of networked nodes hosting containerized applications to be upgraded—Block 210. The identification of each node in the list can be received from a system administrator, can be received from, or determined by, a configuration management application running on the network 99, or by any other suitable technique. The list includes nodes executing OS-level virtualization and hosting the containers running the user application to be upgraded.

For example, a configuration management application, maintained by a system administrator, can maintain a database of nodes running specific applications, each of which has been containerized under an OSLVA. Consider, as part of a continuing example, TABLE 1, which is a database of applications and the nodes on which each application runs.

TABLE 1

| Node | App 1 | App 2 | App 3 |
|---|---|---|---|
| 110<br>IP: 172.16.254.1 | | ✓ | ✓ |
| 120<br>IP: 172.16.254.2 | ✓ | ✓ | |
| 130<br>IP: 172.16.254.3 | ✓ | | ✓ |
| . . . | Varies | Varies | Varies |
| 1ZZ<br>IP: 172.16.254.ZZ | ✓ | | ✓ |

As part of the continuing example, Application 1 is to be upgraded from version x to version x+1. According to the database of TABLE 1, an ordered list of network nodes running Application 1 starts with node 120, includes node 130, and includes each node after 130 to node 1ZZ where Application 1 is hosted in containers under an OSLVA (including on node 1ZZ). Designation of each node in the list can be by any characteristic sufficient to identify the node to the network 99. In the continuing example, the nodes are identified by IPv4 address, since network 99 is an IPv4 network—{172.16.254.2, 172.16.254.3, . . . 172.16.254.ZZ}. In general, the node identification approach used in any particular embodiment adopts the node identification format used by the network, for example, IPv6.

The application upgrade system 140 initiates a first communication of a token among the nodes {172.16.254.2, 172.16.254.3, ... 172.16.254.ZZ} in the listed order and with return to the first listed node from the last listed node—a token ring. The token includes a form of the list. An OSLVA at each node receiving the first communicated token updates the first communicated token with an indication of the liveness of the receiving node—Block 220. In some embodiments, a unicast messaging protocol, such as User Datagram Protocol (UDP) or Transmission Control Protocol (TCP) is used to communicate the token from one listed node to the next listed node. In the continuing example, the token format includes fields for each of a plurality of data items (for each listed node), including, but not limited to, a liveness check field for each node, an upgrade specification field for each application, a health check field for each application, a successful upgrade across nodes indication field, and a roll back field.

In the continuing example, the application upgrade system 140 uses a UDP message to initiate communication of the token to node 120 (the first listed node hosting Application 1). Upon receiving the token, the OSLVA 160 at node 120 updates the received token with an indication of the liveness of OSLVA 160, for example, by setting the liveness check field to "live." As noted above, "liveness" refers to an application's ability to make progress in execution in a timely manner, for example, without deadlock or starvation.

In the case of an OSLVA, the act of updating the token, for example, setting a liveness flag in the liveness check field corresponding to the OSLVA's node, can be taken as an indication of liveness. Other measures of liveness, for example, receipt of a response to a hypertext transfer protocol (HTTP) request within a predetermined time, can be used. The objective of testing for liveness is to determine whether the OSLVA at each listed node is available to respond to subsequent passes of the token. After updating the token, each receiving OSLVA communicates the updated token to the next node in the list. Such communication includes, typical of the operation of a token ring, the last node in the list communicating an updated token to the first node in the list. In the continuing example, node 1ZZ at IP address 172.16.254.ZZ updates the token with an indication of liveness of the OSLVA at node 1ZZ, and then communicates the updated token to node 120 at IP address 172.16.254.2—the first node in the ordered list.

In response to receiving, by the first listed node from the last listed node, the first updated token, the OSLVAs, for example, 160 and 170, second communicate, among the nodes in the listed order and with return to the first listed node from the last listed node, the first updated token. The respective OSVLA upgrades each containerized application to be upgraded at the node receiving the second communicated token in accordance with the upgrade information; and second updates the second communicated token to indicate an upgrade status of the each upgraded containerized application at the node receiving the second communicated token—Block 230. The first updated token includes upgrade information for the containerized applications to be updated at each listed node, for example, placed there by the application upgrade system 140, either originally or upon completion of the first pass of the token around the ring. While shown as a separate application upgrade system 140, the logic for implementing the application upgrade system can be hosted in any node, for example the node with the lowest IP address, or the node at the beginning of the list. One way to tell each node/OSLVA how to act on the token (for example, check liveness of the OSVLA, versus upgrade the containerized application) is to use a field in the token itself that indicates which pass the token is on (or, in the case of multiple successive tokens, which token round).

In the continuing example, the first updated token contains a link to a repository hosting service, along with parameters specifying the version and any version-specific instructions for the upgrade of containerized Application 1 from version x to version x+1. The repository hosting service is accessible via network 99, for example, GitHub™ repository hosting service accessible via the Internet. The OSLVA 160 at node 120, the first listed node in the continuing example, receives the first updated token and reads the upgrade information from the first updated token, and using communications network, retrieves the upgraded version of Application 1 (version x+1) from the repository hosting service via the Internet 99.

Figure 3:
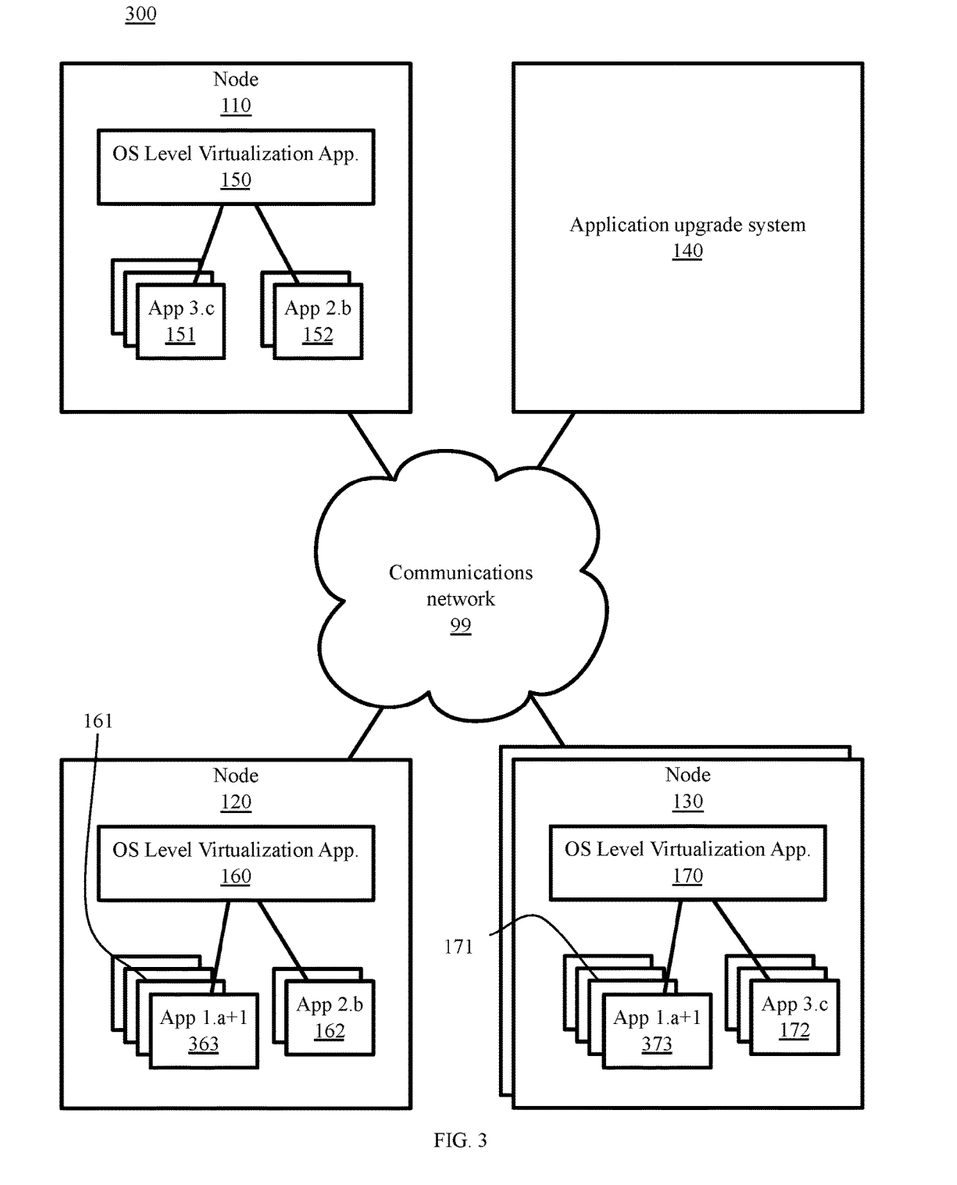
FIG. 3 is a block diagram depicting a communications and processing architecture to update containerized applications, in accordance with certain example embodiments.

Referring to FIG. 3, and continuing to refer to prior figures for context, a block diagram 300 depicting a communications and processing architecture for updating containerized applications after the first two listed nodes upgrade Application 1 is shown, in accordance with certain example embodiments. The OSLVA 160 upgrades containerized Application 1 by creating a new container 363 with Application 1 version x+1 installed, and adjusts the OSLVA 160 to map all I/O related to Application 1 to the new container 363. Note that in the continuing example, the OSVLA 160 retains Application 1 version x 161. Upon successful installation of the new version of the application at the specific node receiving the token, the OSVLA 160 second updates the token (for example, by setting a flag indicating successful establishment of new container 363 hosting Application 1 version x+1), and communicates the token to OSVLA 170 at node 130.

The OSLVA 170 upgrades containerized Application 1 on node 130 by creating a new container 373 with Application 1 version x+1 installed, and adjusting the OSLVA 170 to map all I/O related to Application 1 to the new container 373. Note that in the continuing example, the OSVLA 170 retains Application 1 version x 171. Upon successful installation of the new version of the application at the specific node receiving the token, the OSVLA 170 second updates the token, and communicates the token to the next node in the list. In this fashion, the token proceeds to node 1ZZ, which similarly creates a new container for Application 1 version x+1, adjusts itself to map all I/O related to Application 1 to the new container, updates the token installation field for Application 1 on node 1ZZ to "successful," and communicates the token back to the first node 120.

Returning to FIG. 2, in response to receiving, by the first listed node from the last listed node, the second updated token indicating a successful upgrade of each containerized application to be upgraded, the OSLVAs, for example, 160 and 170, third communicate the second updated token among the nodes in the listed order and with return to the first listed node from the last listed node. The respective OSVLA third updates the third communicated token to indicate the health of each upgraded containerized application at each node receiving the third communicated token—Block 240.

In the continuing example, the OSLVA 160 at the first-listed node 120 receives the second updated token, and updates the token with the containerized user application's health by querying Application 1 version x+1 for its version, and the application's own readiness to execute. If the returned version matches the version expected by the OSLVA 160 and the application indicates a readiness to execute, the OSLVA 160 sets a "healthy" flag in the received token. The OSVLA 160 then communicates the token to the next node in list, node 130, proceeding in this fashion through the last node in the list; which then communicates the third updated token to the first node in the list, node 120.

Figure 4:
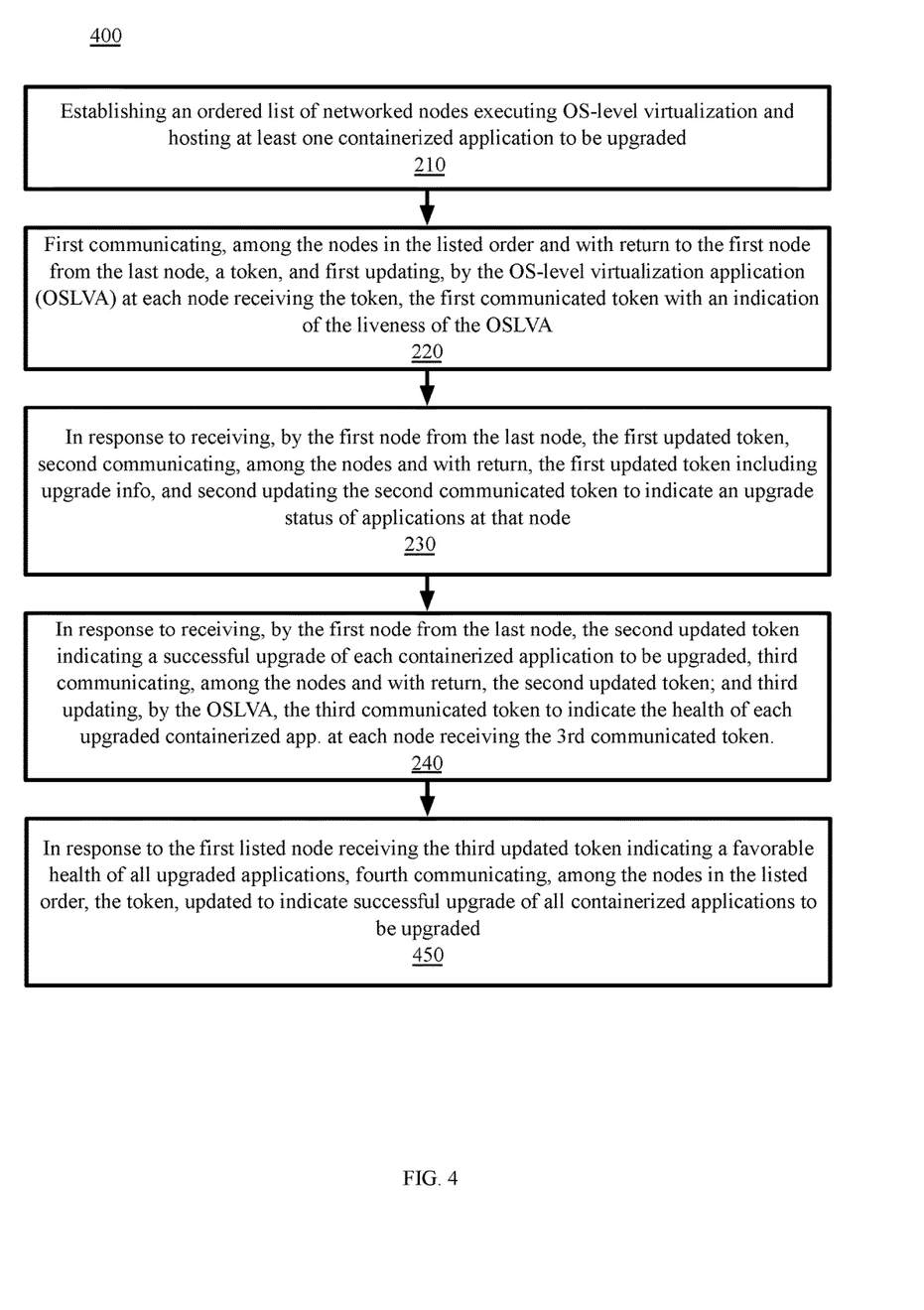
FIG. 4 is a block flow diagram depicting a method to update containerized applications, in accordance with certain example embodiments.

Referring to FIG. 4, and continuing to refer to prior figures for context, a block flow diagram depicting a method 400 to for update containerized applications environment is shown, in accordance with certain example embodiments. In such a method 400, Blocks 210-240 are performed as described elsewhere herein. In such methods, in response to the first listed node receiving the third communicated token indicating a favorable health of each upgraded container, the OSLVAs, for example, 160 and 170, fourth communicate, among the nodes in the listed order, the token updated to indicate successful upgrade of all containerized applications to be upgraded, as opposed to the successful upgrade of individual application instances—Block 450. At this point, each OSLVA, upon receiving the fourth communicated token will direct all I/O with regard to Application 1 to the upgraded version x+1.

In the continuing example, the OSLVA 160 at the first-listed node 120 receives the third updated token from the last listed node 1ZZ, and fourth updates the token to indicate successful upgrade of all containerized applications to be upgraded. The OSLVA 160 at the first-listed node 120 then communicates the fourth updated token to the next node in list, node 130, proceeding in this fashion through the last node in the list; which then communicates the fourth updated token to the first node in the list, node 120. In some embodiments, at this point, each OSLVA offers the upgraded version of the containerized user application to users, e.g., by directing I/O related to the application to the upgraded version of the application.

Figure 5:
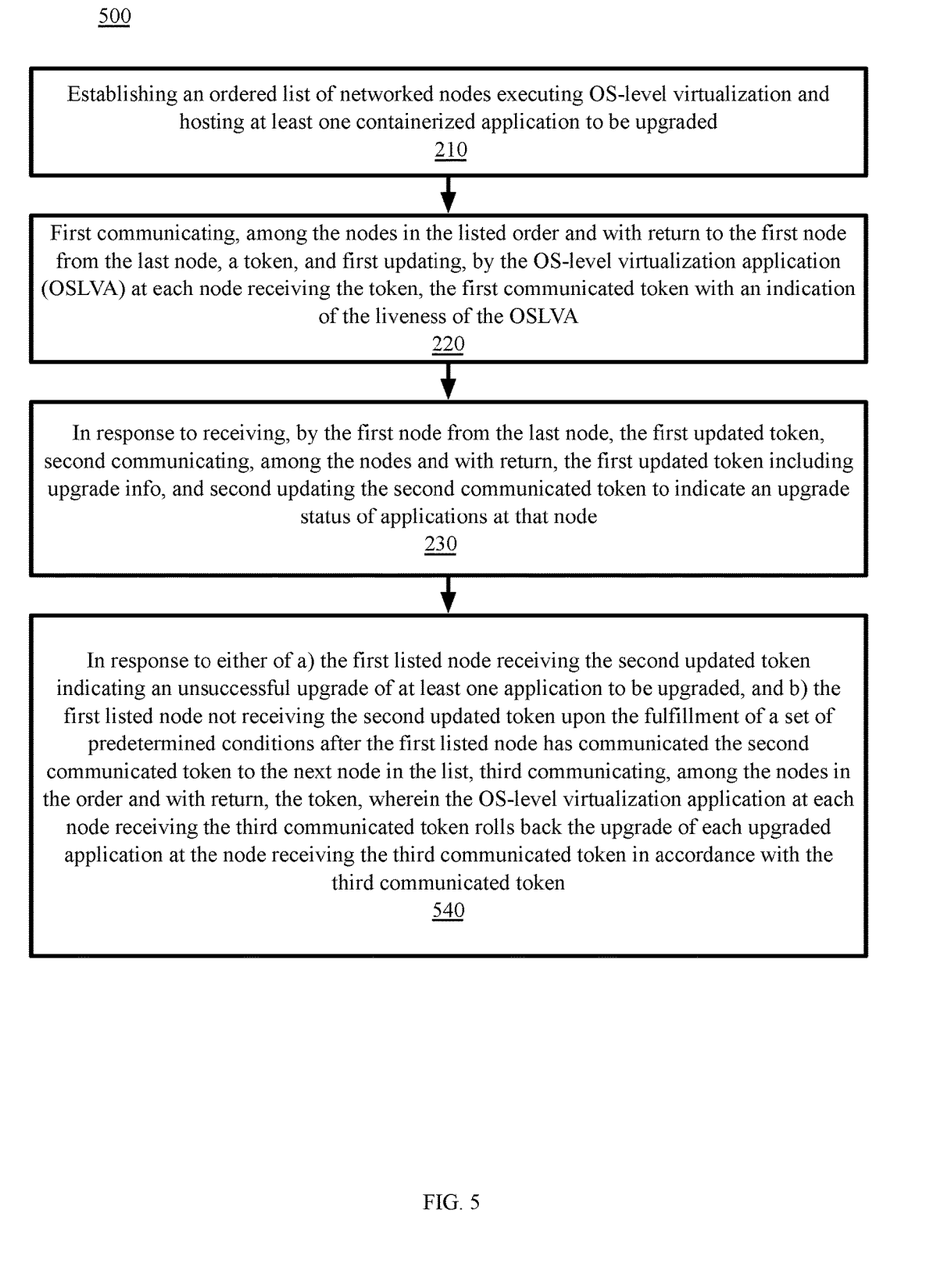
FIG. 5 is a block flow diagram depicting a method to update containerized applications, in accordance with certain example embodiments.

Referring to FIG. 5, and continuing to refer to prior figures for context, a block flow diagram depicting a method 500 to update containerized applications is shown, in accordance with certain example embodiments. In such a method 500, Blocks 210-230 are performed as described elsewhere herein. In some situations, the first listed node can receive the second communicated token indicating an unsuccessful upgrade of at least one application to be upgraded, for example, the upgrade flag in the token for a given node can be set to "failed." In other situations, the first listed node can have not yet received the second updated token upon the fulfillment of a set of predetermined conditions after the first listed node has second communicated the token to the next node in the list. For example, the predetermined condition can be a period of time, such as twice the expected latency around the token ring for transmission between nodes and processing at each node, e.g., 1 sec.

In response to either of these situations, the OSLVAs, for example staring with node 160, third communicate, among the nodes in the listed order and with return to the first listed node from the last listed node, the token, including direction (such as a set "roll back" flag and a data field indicating the version for roll back). The OS-level virtualization application at each node receiving the third communicated token rolls back the upgrade of each upgraded container at the node receiving the third communicated token in accordance with the third communicated token—Block 540.

In the continuing example, the upgrade of Application 1 to version x+1 by OSLVA 170 on node 130 was unsuccessful, and the second communicated token was updated by OSLVA 170 to indicate the unsuccessful upgrade. Upon the second updated token arriving back at the first listed node, node 120, the OSVLA 160 third communicates the token to node 130 with an indication, for example a set "roll back" field, to each receiving node to roll back Application 1 to version x 171. Since the container for Application 1 version x 171 remains in node 130 under management of OSVLA 170, rolling back to Application 1 version x means that OSVLA 170 directs all Application 1 I/O to/from Application 1 version x 171. In some embodiments, each OSLVA that rolls back the application indicates the roll back in the token before communicating the token to the next node in the list. In each case, the token propagates back to the initial node indicating the roll back status of the application at each node.

Figure 6:
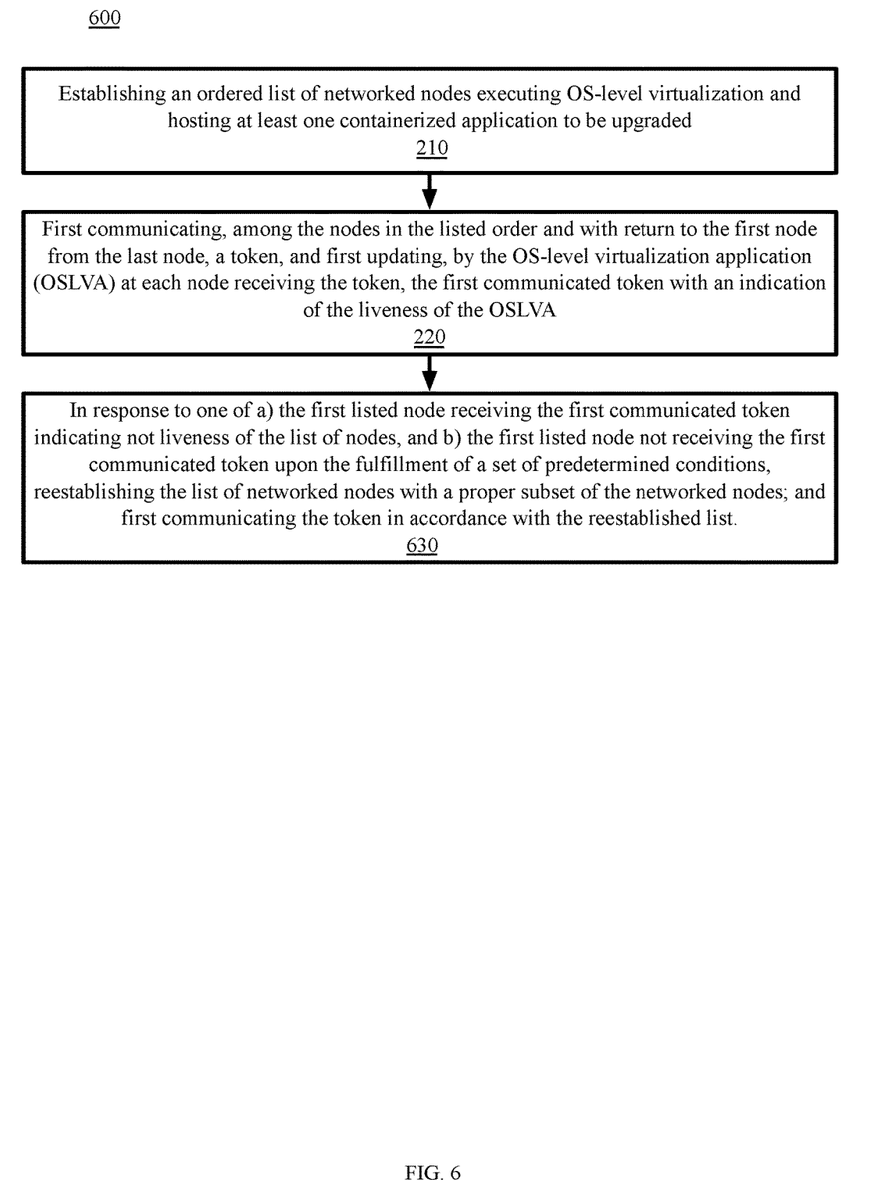
FIG. 6 is a block flow diagram depicting a method to update containerized applications, in accordance with certain example embodiments.

Referring to FIG. 6, and continuing to refer to prior figures for context, a block flow diagram depicting a method 600 to update containerized applications is shown, in accordance with certain example embodiments. In such a method 600, Blocks 210-220 are performed as described elsewhere herein. In some situations, the first listed node receives the first communicated token indicating failed liveness of the nodes in the list of nodes. In other situations, the first listed node does not receive the first communicated token upon the fulfillment of a set of predetermined conditions, such as a limit of time.

In response to either of these situations, the application upgrade system 140 reestablishes the list of networked nodes with a proper subset of the networked nodes, and then first communicates, second communicates, and third communicates the token (as described elsewhere herein) in accordance with the reestablished list—Block 630. Reestablishing the list can include re-querying any nodes that set a flag in the liveness field of the token to "failed liveness," and upon confirming continued "failed liveness" of the node, deleting the node from the ordered list. In the continuing example, the first node 120 receives the first communicated token from the last node 1ZZ, with the liveness field in the token corresponding to the OSVLA 170 for node 130 set to "failed liveness." Every other node in the list reports a live OSVLA. One of the application upgrade system 140 and the first node 120 reestablishes the list by deleting node 130 from the ordered list of nodes, and then begins the process over again with the reestablished list.

In a modern data center, hundreds or thousands of nodes may each be running a container runtime. These runtimes run containers housing user applications. It may be desirable to upgrade certain user applications at some point, and if the upgrade fails, to downgrade all of the user applications that were previously upgraded. Consider a 100-node cluster where a container runtime is running on each node. The container runtime on each node holds one application to upgrade—which is not to say that the container runtime on each node holds only one container or one application. Ideally, all the applications to be upgraded, across the cluster, would upgrade at the same time. If any application failed to upgrade, for example, because of some external health-check, the entire group of applications to be upgraded in the cluster are downgraded so technical staff could identify the failure of the upgrade.

In some embodiments of the present technology, a logical ring is created from the IP addresses of the 100-node cluster. The ring list is constructed from a configuration file containing the list of nodes, although other methods can be used to produce a group membership.

In some embodiments, the smallest IP address in the list is responsible for originating and controlling operation of a token around the ring. The token has three roles. The first role is for checking the liveness of the entire cluster, specifically of the container runtime at each node housing an application to be upgraded. In some embodiments, one objective is to upgrade or downgrade a set of applications across the entire cluster atomically (or at least in an all-or-none fashion). The first step is to circulate the liveness token check, for example, to check the health of the container runtime and make sure it is able to process requests.

Once the liveness token reaches the node that originated the token, a token with upgrade information, which can be considered a second pass of the same token or even a separate token, is sent around the ring. This pass of the token triggers the container engine to execute the upgrade process, for example, by prompting the container engine to seek a specific installation package from a repository housing service.

In some embodiments, one node is deterministically chosen as the token originator. Typically, this is the lowest 32-bit IP address in the membership list, although with IPV6 other techniques could be used.

The token originator places a list in the token, and in array format, of IP addresses of nodes at which an application to be upgraded is housed in the token. Each array entry contains information about the token, such as health status, how many times a retransmit may have occurred on that node or other critical information to the correct operation of the cluster. The token originator node sends the token via UDP or some other underlying unicast protocol.

In some embodiments, a count of token retransmits is used as a configuration option to automatically retransmit the UDP token. This process permits the next node in the ring to tolerate some loss of tokens. The token contains an index value. Each time a token is transmitted, but not retransmitted, the index is incremented. This index permits each node in the cluster to be aware of the next node that should be used for token receipt.

Once the token has reached the token originator the second time, a third pass of the token is used to check the health of the upgraded applications (and in some embodiments, of the containers, the container runtimes, and the nodes themselves).

In some embodiments, health information is stored in the ring at each node during token propagation for diagnostic purposes. Once the token has propagated the nodes using the techniques already described in this disclosure, the token arrives at the token originator.

If all health-check information succeeded on the token originator node by the third rotation, a fourth token pass is originated to inform every node/container runtime that the upgrade was successful. Then each node/container runtime can have access to the information regarding the upgrade without contacting a centralized service.

If any health-check in the failed in the third rotation of the token, a fourth token is originated to perform a downgrade operation to the known working containerized user applications. Since the containers are immutable, the downgraded version of the containerized application can be expected to restart correctly (assuming it was running properly before the upgrade).

Embodiments of the present technology upgrade, and in the case of failure, downgrade, a containerized user application across multiple nodes in an all-or-nothing fashion (often referred to in the art as "atomically"). The above token rotation operation is faster than logging into each machine to upgrade. Further, known methods do not perform automatic downgrades upon a partial failure of an atomic upgrade. In embodiments of the present technology, the operator requests an upgrade, the upgrade either succeeds, or fails with diagnostic information providing the reason for failure. Embodiments of the present technology address a problem rooted in the technology of applications distributed across a network, and present a solution rooted in computer network technology—specifically a novel use of tokens in a containerized application environment. In implementations of the present technology, the operation of the applications, the network, and the computers themselves are enhanced, at least in part by enabling automatic upgrade across multiple network nodes.

OTHER EXAMPLE EMBODIMENTS

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM).

Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and computer program products described herein address the challenges associated with all-or-nothing upgrade of containerized user applications across a plurality of nodes. Absent such an approach, resource-intensive manual upgrade, or at least manual downgrade for a filed all-or-nothing upgrade across all the containerized user applications to be upgraded, must be used. The present disclosure describes a token passing solution, a solution rooted in computer and computer network technology to address a problem, upgrading containerized applications on an all-or-nothing basis, rooted in computer and computer network technology.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, while several embodiments described herein disclose multiple passes of a token, either the same token format (with values updated or modified at each node and on each pass) can be used, or a new token can be created on each pass.

I claim:

1. A method, comprising:
    establishing, by one or more computers, an ordered list of networked nodes, the list comprising nodes executing operating system level (OS-level) virtualization and hosting at least one containerized application to be upgraded;
    first communicating, among the nodes in the listed order and with return to the first listed node from the last listed node, a token;
    first updating, by the OS-level virtualization application at each node receiving the first communicated token prior to communicating the token further, the first communicated token with an indication of liveness of the OS-level virtualization application at the node receiving the first communicated token;
    in response to receiving, by the first listed node from the last listed node, the first updated token indicating that all nodes are live, second communicating, among the nodes in the listed order and with return to the first listed node from the last listed node, the first updated token, the first updated token comprising upgrade information; and
    upgrading, by the OS-level virtualization application at each node receiving the second communicated token, each containerized application to be upgraded at the node receiving the second communicated token in accordance with the upgrade information, and second updating the second communicated token to indicate a successful upgrade of the each upgraded containerized application at the node receiving the second communicated token prior to communicating the token further.

2. The method of claim 1, further comprising,
    in response to receiving, by the first listed node from the last listed node, the second updated token indicating a successful upgrade of each containerized application to be upgraded, third communicating, among the nodes in the listed order and with return to the first listed node from the last listed node, the second updated token; and
    third updating, by the OS-level virtualization application at each node receiving the second updated token, the third communicated token to indicate the health of each upgraded containerized application at each node receiving the third communicated token prior to communicating the token further.

3. The method of claim 2, further comprising, in response to the first listed node receiving the third updated token indicating a favorable health of each upgraded container, fourth communicating, among the nodes in the listed order, the token updated to indicate successful upgrade of all containerized applications to be upgraded; and executing, at each listed node, the upgraded application.

4. The method of claim 2, wherein the list of networked nodes is ordered by an Internet Protocol (IP) address of each node in the list.

5. The method of claim 2, wherein communication of the token among the nodes comprises communication using a unicast protocol.

6. The method of claim 5, wherein the unicast protocol is one of User Datagram Protocol and Transmission Control Protocol.

7. A computer program product, comprising:
    a non-transitory computer-readable storage device having computer-executable program instructions embodied thereon that when executed by a computer cause the computer to:
        establish an ordered list of networked nodes, the list comprising nodes executing operating system level (OS-level) virtualization and hosting at least one containerized application to be upgraded;
        first communicate, among the nodes in the listed order and with return to the first listed node from the last listed node, a token;
        first update, by the OS-level virtualization application at each node receiving the first communicated token prior to communicating the token further, the first communicated token with an indication of liveness of the OS-level virtualization application at the node receiving the first communicated token;

in response to receiving, by the first listed node from the last listed node, the first updated token indicating that all nodes are live, second communicate, among the nodes in the listed order and with return to the first listed node from the last listed node, the first updated token, the first updated token comprising upgrade information; and upgrade, by the OS-level virtualization application at each node receiving the second communicated token, each containerized application to be upgraded at the node receiving the second communicated token in accordance with the upgrade information, and second updating the second communicated token to indicate a successful upgrade of the each upgraded containerized application at the node receiving the second communicated token prior to communicating the token further.

8. The computer program product of claim 7, wherein the storage device further comprises computer-executable program instructions embodied thereon that when executed by a computer cause the computer to:

in response to receiving, by the first listed node from the last listed node, the second updated token indicating a successful upgrade of each containerized application to be upgraded, third communicate, among the nodes in the listed order and with return to the first listed node from the last listed node, the second updated token; and third update, by the OS-level virtualization application at each node receiving the second updated token, the third communicated token to indicate the health of each upgraded containerized application at each node receiving the third communicated token prior to communicating the token further.

9. The computer program product of claim 8, wherein the storage device further comprises computer-executable program instructions embodied thereon that when executed by a computer cause the computer to:

in response to the first listed node receiving the third updated token indicating a favorable health of each upgraded container, fourth communicate, among the nodes in the listed order, the token updated to indicate successful upgrade of all containerized applications to be upgraded; and executing, at each listed node, the upgraded application.

10. The computer program product of claim 8, wherein the list of networked nodes is ordered by an Internet Protocol (IP) address of each node in the list.

11. The computer program product of claim 8, wherein communication of the token among the nodes comprises communication using a unicast protocol.

12. The computer program product of claim 11, wherein the unicast protocol is one of User Datagram Protocol and Transmission Control Protocol.

13. A system to use one-time codes to provide user feedback to merchants, the system comprising:

a storage device; and a processor communicatively coupled to the storage device, wherein the processor executes application code instructions that are stored in the storage device to cause the system to:

establish an ordered list of networked nodes, the list comprising nodes executing operating system level (OS-level) virtualization and hosting at least one containerized application to be upgraded;

first communicate, among the nodes in the listed order and with return to the first listed node from the last listed node, a token;

first update, by the OS-level virtualization application at each node receiving the first communicated token prior to communicating the token further, the first communicated token with an indication of liveness of the OS-level virtualization application at the node receiving the first communicated token;

in response to receiving, by the first listed node from the last listed node, the first updated token indicating that all nodes are live, second communicate, among the nodes in the listed order and with return to the first listed node from the last listed node, the first updated token, the first updated token comprising upgrade information; and upgrade, by the OS-level virtualization application at each node receiving the second communicated token, each containerized application to be upgraded at the node receiving the second communicated token in accordance with the upgrade information, and second updating the second communicated token to indicate a successful upgrade of the each upgraded containerized application at the node receiving the second communicated token prior to communicating the token further.

14. The system of claim 13, wherein the processor further executes application code instructions that are stored in the storage device to cause the system to:

in response to receiving, by the first listed node from the last listed node, the second updated token indicating a successful upgrade of each containerized application to be upgraded, third communicate, among the nodes in the listed order and with return to the first listed node from the last listed node, the second updated token; and third update, by the OS-level virtualization application at each node receiving the second updated token, the third communicated token to indicate the health of each upgraded containerized application at each node receiving the third communicated token prior to communicating the token further.

15. The system of claim 14, wherein the processor further executes application code instructions that are stored in the storage device to cause the system to:

in response to the first listed node receiving the third updated token indicating a favorable health of each upgraded container, fourth communicate, among the nodes in the listed order, the token updated to indicate successful upgrade of all containerized applications to be upgraded; and executing, at each listed node, the upgraded application.

16. The system of claim 14, wherein the list of networked nodes is ordered by an Internet Protocol (IP) address of each node in the list.

17. The system of claim 14, wherein communication of the token among the nodes comprises communication using a unicast protocol.

18. The system of claim 17, wherein the unicast protocol is one of User Datagram Protocol and Transmission Control Protocol.

* * * * *